June 28, 1960     L. G. W. KNOTT ET AL     2,943,188
TRANSMITTER-RECEIVER FOR RADIO LOCATION Filed May 27, 1953     2 Sheets-Sheet 1 united States Patent Office 2,943,188
Patented June 28, 1960

2,943,188
TRANSMITTER-RECEIVER FOR RADIO LOCATION

Leonard George Walter Knott and David Kerr, London, England, assignors to Ultra Electric Incorporated, Wilmington, Del.

Filed May 27, 1953, Ser. No. 357,698

Claims priority, application Great Britain Nov. 14, 1952

14 Claims. (Cl. 250—13)

This invention relates to a system of radio-location. More particularly the invention relates to the construction and arrangement of portable transmitting means for use in a radio locating system of the homing type whereby a person lost, for example, at sea may be rapidly and accurately located by searching vehicles, such as aircraft and surface vessels.

The invention has for its object to provide, for use in a system of radio-location of the above type, an equipment of radio apparatus, sufficiently compact to be susceptible of attachment to inflatable jackets or other aids to human flotation, and to be carried by a lost person and hereinafter referred to as a "beacon," which equipment comprises apparatus capable of transmitting a characteristic pulsed signal and which may also be capable of transmitting and receiving radio telephony and also Morse signals. The radio transmitting apparatus thus provided may be used in combination with one or more receivers, carried by the searching vehicle or vehicles, capable of receiving and displaying the said pulsed signals in a cathode-ray tube and indicating the direction from whence they come, of distinguishing the said beacons one from another, of measuring the distance between itself and a beacon and of receiving and transmitting radio telephony to and from the said beacons.

A characteristic feature of the present invention is that the radio frequency at which the said beacons and receivers operate and the length and disposition of the aerial attached to the beacons are such that the radiation pattern of a beacon consists of a strong lobe emitted equally in all directions of azimuth, at a small angle to the horizontal, and of a narrow vertical cone of very low radiation strength, so that an aircraft, flying at a sufficient height, may receive the signal from a beacon at a great distance, and even though maintaining the same height may receive an accurate indication of the fact of flying directly over a beacon, such indication being a momentary drop in the strength of the received signal to a very low value.

The invention also consists in the various means and constructions hereinafter described with reference to the accompanying drawings, in which.

Figure 1:
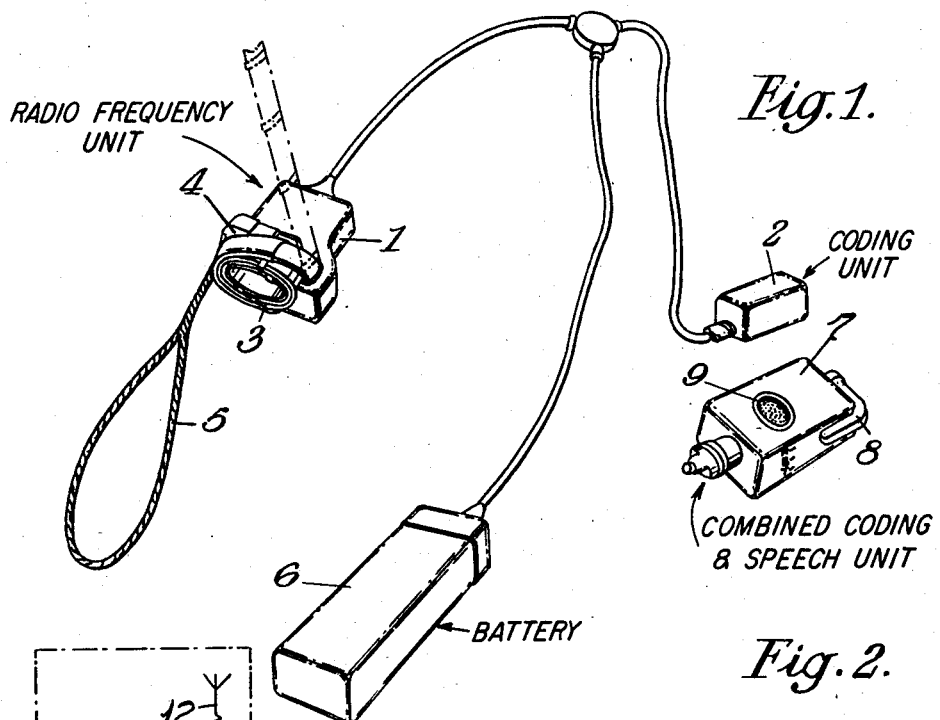
Figure 1 shows the components of the equipment constituting a beacon according to the invention.

Referring to Figure 1, 1 is a radio frequency unit containing an oscillator and 2 is a coding unit, the combination of these units comprising a transmitter finding particular utility in the systems described in copending Patent Applications Nos. 353,870, 385,623 and 385,625, filed May 8th, October 12th and October 12th, respectively, 1953, and assigned to the assignee of this application. The radio frequency unit 1 is connected to a preferably collapsible aerial 3, for instance, the one described in copending application Serial No. 343,995, filed March 23, 1953, which aerial is retained in its collapsed state by the clip 4, when it is not in operation. A lanyard 5 is attached to the clip 4 and also to a main switch (not shown), which switches on the beacon simultaneously with removal of the clip 4. Power for the beacon is obtained from the battery 6, which may contain either low tension and high tension sections or a low tension section and a vibrator. The various parts are connected together in such a manner that they can be conveniently accommodated, for example, in an inflatable life-saving jacket, and all of them are rendered waterproof.

A speech unit 7 embodying both speech and coding may be substituted for the coding unit 2. The speech and coding functions of the unit 7 may be controlled by a three position switch 8. The speech unit comprises an audio frequency section and a magnetic microphone 9 acting also as a speaker.

In operation, the lanyard 5 is pulled, removing the clip 4 and operating the power switch, thereby allowing the collapsible aerial 3 to erect and causing the beacon to be switched on. When the coding unit 2 is connected, no further action is taken by the person using the beacon. When the speech unit 7 is connected, he may transmit speech by moving the switch 8 to the position marked "T," or may receive speech by moving the said switch to the position marked "R," placing the ear-piece/microphone 9 (electro-mechanical transducer) to the ear or mouth respectively. The switch 8 is normally held by a spring in its central position, marked "B," when the coding circuit referred to is in operation.

Figure 2:
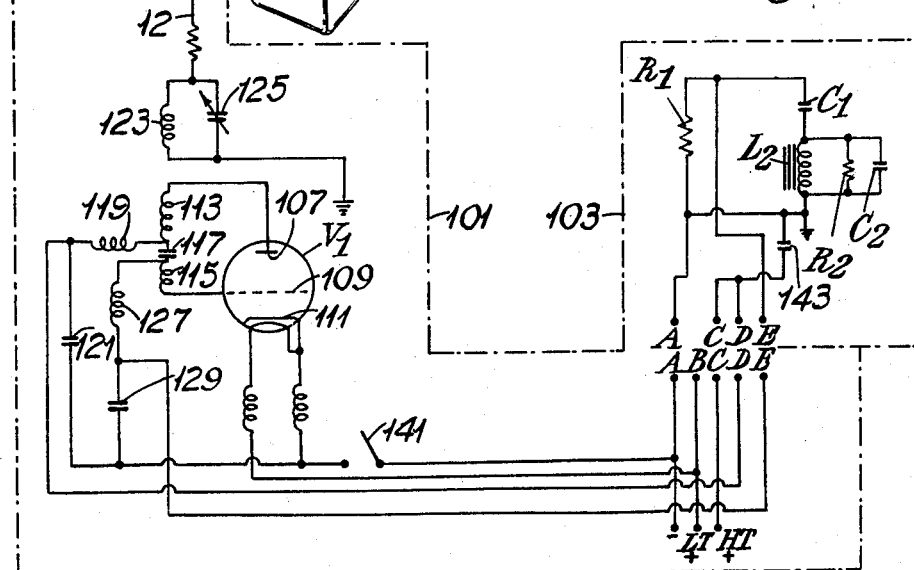
Figure 2 is the circuit diagram of the radio frequency and coding units of a beacon and showing the interconnections thereof.

Reference should now be had to Fig. 2 wherein the circuit of a typical beacon is shown in schematic form. Basically the circuit may be divided into two component parts: (1) the R.F. unit within the dotted rectangle 101 and corresponding to the unit 1 of Figure 1 and (2) the modulating or coding unit within the dotted rectangle 103 corresponding to coding unit 2 of Figure 1.

The R.F. unit includes an oscillator, an antenna coupling arrangement, and an antenna. The oscillator is of the colpitts type and comprises the vacuum tube $V_1$ having at least an anode 107, a control grid or element 109 and a cathode 111. A feedback transformer has its primary winding 113 connected in series with the anode 107, and its secondary winding 115 connected in series with the control grid 109. The free ends of the transformer windings are connected through a direct current blocking capacitor 117. Operating voltage for the anode 107 is obtained from a terminal marked +HT which is connected by way of plug connections C and D, which are interconnected in the coding unit 103, to the junction of 113 and 117 through a radio frequency choke 119. Capacitor 121 is a radio frequency by-pass to ground. Coupled to the feedback transformer is a tertiary winding 123 which is connected between an antenna 12 and ground. As shown, a trimmer capacitor 125 may be provided for tuning the antenna circuit.

The modulating unit 103 when connected to the unit 101 completes the grid-cathode circuit of the oscillator; the unit 103 being connected through the radio frequency choke 127 to the junction between winding 115 and capacitor 117. Capacitor 129 is another radio frequency by-pass to ground. Unit 103 comprises a grid leak resistance $R_1$ which is effectively connected between the control grid 109 and the cathode 111. Shunting resistor $R_1$ is a timing capacitor $C_1$ in series with a ringing circuit comprising choke $L_2$, capacitor $C_2$, and damping resistor $R_2$.

The beacon circuit is completed by the provision of a power switch 141 and an anode voltage storage capacitor 143, in units 101 and 103, respectively.

When the switch 141 is closed the filament of tube $V_1$ is energized from the low voltage supply marked +LT and voltage is applied between the anode and cathode. The circuit will commence to oscillate at a radio frequency determined by the circuit constants. By suitable adjustment the tube is arranged to draw grid current while oscillating, thereby building up a charge across capacitors $C_1$ and $C_2$ in series. The charge quickly blocks the tube causing an interruption of the oscillations. Operating thusly, the oscillator may be referred to as a squegging oscillator. However, as a result of the rapid charging of capacitor $C_2$, the ringing circuit commences to produce a damped sinusoidal wave. The value of resistor $R_2$ determines the degree of damping in known manner. When the junction between capacitors $C_1$ and $C_2$ swings in the positive direction with respect to the other terminal of capacitor $C_2$ it will briefly overcome the bias due to the charge on capacitor $C_1$ and the tube $V_1$ will begin again to oscillate. When the above junction swings negatively again the oscillations will cease. Thus, the squegging action of the oscillator is further modulated. This sequence would normally repeat itself until the damped sinusoidal wave died out. However, during each period of oscillation the capacitor $C_1$ will receive an additional charge which in conjunction with the damping effect of resistor $R_2$ will cause the tube $V_1$ to stop oscillating eventually and to remain dormant for an extended period. This period will be determined by the time it takes the charge on capacitor $C_1$ to leak off through resistor $R_1$. In the meantime the charge on capacitor $C_2$ will have been dissipated across choke $L_2$ and the resistor $R_2$.

There is thus provided a circuit which transmits spaced groups of two or more pulses each. The spacing between the individual pulses of a group is determined by proper selection of $L_2$, $C_2$ and $R_2$. The intergroup spacing is determined by suitable choice of $R_1$ and $C_1$. As stated in copending application Serial No. 353,870, the over-all pulse repetition rate is preferably in the neighborhood of 200–1000 pulses per second (i.e. low audio frequency).

Figure 3:
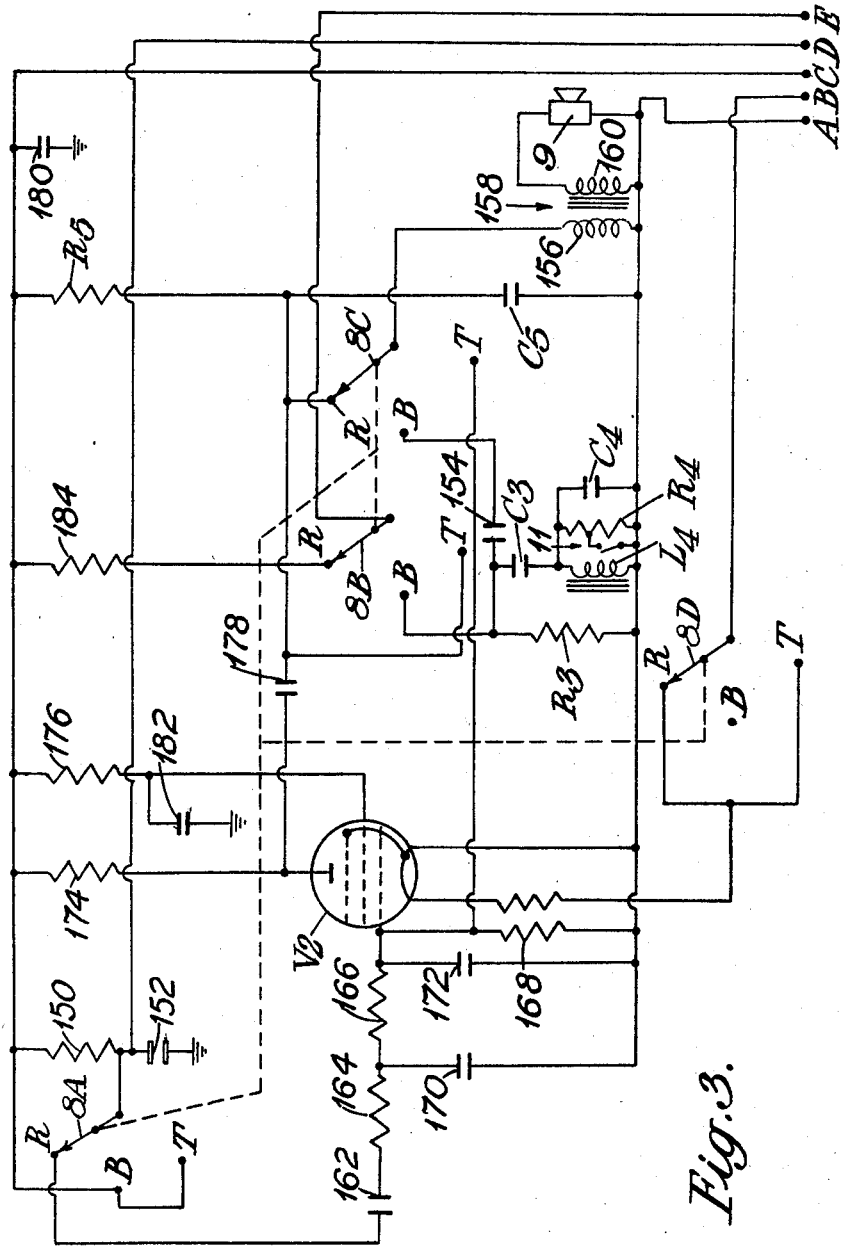
Figure 3 is the circuit diagram of a coding unit combined with a speech unit for use with the radio frequency unit of Figure 2.

Figure 3 represents the circuit diagram of the speech unit 7 of Figure 1. In operation the circuit shown in Figure 3 is connected to the R.F. unit 101 of Figure 2 in place of the coding unit 103, the terminals marked "A," "B," "C," "D," and "E" being in correspondence.

To facilitate understanding the construction and operation of the circuit of Figure 3 it will be helpful to note that the terminals "A" through "E" in Figure 3 are connected respectively to the negative potential (—), the filament supply (+LT), the plate supply (+HT), the plate circuit of tube $V_1$, and the grid circuit of tube $V_1$, all of which are shown in Figure 2.

With the switch 8 comprising ganged sections 8A, 8B, 8C, and 8D in the central position, marked "B" in Figures 1 and 3, a coding circuit comprising $R_3$ and $C_3$, $L_4$, $R_4$ and $C_4$, similar to that described with reference to Figure 2, is in operation, the valve $V_2$ being inoperative. Note that the section 8D of the switch 8 interrupts the connection between the filament supply and the filament of tube $V_2$ in position "B."

Also note that in position "B" in section 8A of switch 8 short-circuits a voltage dropping resistor 150. It will be seen that a circuit can be traced from the plate supply terminal "C" of Figure 3 to contact B of switch section 8A, then via the switch arm and terminals "D" to the plate 107 of tube $V_1$. The capacitor 152 connected between resistor 150 and ground serves as an additional by-pass for radio frequency energy.

With switch section 8B in position B a connection is established between the ungrounded terminal of resistor $R_3$, via the terminals "E," and the control grid circuit of tube $V_1$. At the same time the same terminal of resistor $R_3$ is connected through a coupling capacitor 154 and switch section 8C to the winding 156 of input/output transformer 158. The other winding 160 of the transformer is coupled to the transducer 9.

It will thus be seen that in position "B" the switch 8 causes maximum voltage to be applied to the plate circuit of tube $V_1$ and also couples the coding circuit to the transducer. This latter connection provides a monitoring tone in transducer 9 to signify that the circuit is operating on "beacon." As stated above in describing Figure 2, tube $V_1$ is now operating as a squegging oscillator.

With the switch 8 in the position "R" the radio frequency unit operates as a super-regenerative receiver, the output of valve $V_1$, which is of audio frequency, being amplified by the valve $V_2$, the output of which is fed to the ear-piece/microphone 9.

This will be better understood if time is taken to trace the several circuits. Consider Figures 2 and 3 together and assume that the circuit of Figure 3 is coupled to the unit 101 in Figure 2. A first connection is completed from the plate supply (+HT) to terminals "C" and through dropping resistor 150 to terminals "D" and then to the plate circuit of tube $V_1$. Switch section 8A, instead of short circuiting resistor 150, now operates to connect the plate circuit of tube $V_1$ through coupling capacitor 162 to the filter network comprising resistors 164, 166 and 168 and capacitors 170 and 172. The filter network is coupled to the control grid of tube $V_2$ which operates as an audio amplifier and has its filament connected through switch section 8D to the filament supply (+LT). Plate and screen grid voltage is supplied to tube $V_2$ by way of resistors 174 and 176, respectively.

The output is taken from tube $V_2$ from its plate electrode by a coupling capacitor 178 which is connected through switch section 8C to transformer 158 and transducer 9. Resistor $R_5$ and capacitor $C_5$ which are connected in this circuit at this time introduce additional filtering.

In order to by-pass resistor 150 to ground for radio frequency energy when the system is operating on "receive" there is provided a capacitor 180. Capacitor 182 is a screen by-pass for tube $V_2$.

The super-regenerative operation referred to above is brought about by the reduction of plate voltage on tube $V_1$ by means of resistor 150 and by connecting the grid circuit of tube $V_1$ to the plate supply (+HT) through a current limiting resistor 184. See the R position of switch section 8B.

When the switch 8 is in the position "T," the audio signal from the ear-piece/microphone 9 is amplified by the valve $V_2$, and is applied to the grid of valve $V_1$. The latter valve operates as a squegging oscillator, the squegging frequency of which is controlled by the resistor $R_5$ and the capacitor $C_5$ to be at a value in the upper end of the audio frequency range, for example 12 kc. s./sec. By this arrangement the squegging frequency is modulated by the audio frequency. In this mode of operation switch section 8A again short-circuits resistor 150 causing tube $V_1$ to operate as a squegging oscillator. However, it will be observed that the junction between resistor $R_5$ and capacitor $C_5$ is connected through switch section 8B to the grid circuit of tube $V_1$. The output of tube $V_2$ is fed also to the grid circuit of tube $V_1$ through capacitor 178. Since the coding elements $R_3$, $C_3$, $L_4$, $R_4$ and $C_4$ are not in the circuit, the squegging frequency of the squegging oscillator is determined solely by the constants of $R_5$ and $C_5$ as modulated by the output of tube $V_2$. Tube $V_2$, in turn, is controlled by the transducer 9 which is coupled to the grid leak resistor 168 through switch section 8C and transformer 158. The filter elements 166, 170 and 172 are still connected to the control grid of tube $V_2$; however, they offer a high shunt impedance to the audio frequency signals supplied by the transducer and can, therefore, be neglected.

The presence of the coding unit in the equipment enables the person using the beacon to transmit information in Morse code. For this purpose, the circuit shown in Figure 2 or that shown in Figure 3 may include a switch to change the value of $R_2$ or $R_4$ respectively. See switch 11 in Figure 3, for example. Thus, for example, if two pulses normally constitute a group with the switch closed, the operation or opening of the switch will alter the number of said pulses to four. Such change in the number of pulses will be visible on the screen of the receiver on the searching vehicle, so that the transmission may be read.

We claim:

1. For use in a radio locating system of the homing type a radio transmitting device comprising a one tube squegging oscillator with associated radio and squegging frequency determining components for generating spaced bursts of radio frequency energy, and a shock excited resonant ringing circuit related to said components and connected to the input of said oscillator, responsive to operation of said oscillator for pulse modulating said spaced bursts of energy thereby to provide spaced groups of pulses of said energy.

2. For use in a radio locating system of the homing type a radio transmitting device including a squegging oscillator comprising a vacuum tube having at least a control grid and a cathode, circuit means coupled with said tube for causing oscillation thereof at a given radio frequency, and a timing circuit coupled between said grid and cathode, said timing circuit comprising a grid leak resistance in parallel with a timing capacitor and parallel resonant ringing circuit in series, the constants of said timing circuit being related to said circuit means such that said oscillator generates spaced groups of pulses of radio frequency energy, with each pulse consisting of a short burst of said radio frequency energy.

3. For use in a radio locating system of the homing type a radio transmitting device comprising a one tube squegging oscillator with associated radio and squegging frequency determining components for generating spaced bursts of radio frequency energy, a shock excited resonant ringing circuit related to said components and connected to the input of said oscillator, responsive to operation of said oscillator for pulse modulating said spaced bursts of energy with each pulse consisting of a shorter burst of said radio frequency energy, an electro-mechanical transducer for converting electrical energy into sound, and means coupling said transducer to said ringing circuit for providing a characteristic audible signal when said oscillator is operating.

4. A radio transmitting device for use in a radio locating system of the homing type, said transmitting device including a squegging oscillator comprising a vacuum tube having at least a control grid and a cathode, circuit means coupled with said tube for causing oscillation thereof at a given radio frequency, a first timing circuit adapted to be connected between said grid and cathode for causing said oscillator to generate spaced groups of pulses of said radio frequency energy at a low audio frequency, a second timing circuit including modulating means having an electro-mechanical transducer responsive to voice signals, said second timing circuit being adapted to be connected between said grid and cathode for causing said oscillator to generate spaced bursts of said radio frequency energy, the frequency of said bursts being variable about a mean high audio frequency in response to said voice signals, and switch means coupled between said first and second timing circuits and said grid and cathode for selectively connecting one or the other of said timing circuits between said grid and cathode, whereby said transmitting device transmits pulse frequency modulated signals or unmodulated energy conserving signals selectively as desired.

5. A radio transmitting device according to claim 4, further comprising additional switch means intercoupling said electro-mechanical transducer and said modulating means, said additional switch means being further coupled to said first timing circuit and constructed and arranged to couple said electro-mechanical transducer to said modulating means or said first timing circuit, whichever is connected between said grid and cathode, whereby said transducer functions as a microphone or a monitoring speaker, respectively, when said transmitting device is transmitting said modulated or unmodulated signals.

6. A beacon device for use in a radio locating system of the homing type comprising a one tube, radio frequency oscillator circuit, a timing circuit adapted when connected between the control electrode and cathode of the one tube of the oscillator circuit to cause the oscillator circuit to operate as a squegging oscillator for generating timed bursts of radio frequency energy with the timing circuit determining the timing of said bursts, voltage dropping means, and selectably operable switch means coupled to said timing circuit, said voltage dropping means, and said oscillator circuit and constructed and arranged in a first position to connect said timing circuit between the said control electrode and cathode and to maintain said voltage dropping means inoperative for causing said beacon device to generate said timed bursts of radio frequency energy, said switch means being constructed and arranged in a second position to disconnect said timing circuit from the oscillator circuit and to connect said voltage dropping means in the plate voltage supply circuit of the one tube of the oscillator circuit to apply reduced plate voltage thereto, said voltage dropping means being proportioned with respect to said oscillator circuit such as to cause said oscillator circuit to function as a super-regenerative detector for intelligence bearing radio frequency signals.

7. A beacon device according to claim 6, wherein said timing circuit comprises a grid leak resistance in parallel with a timing capacitor and parallel resonant ringing circuit in series, the constants of said timing circuit being related to those of said oscillator circuit for causing said beacon device when operating as a squegging oscillator to generate spaced groups of pulses of radio frequency energy at a low audio frequency.

8. A beacon device according to claim 7, wherein there is provided an electro-mechanical transducer for converting electrical energy into sound, and means coupling said transducer to said timing circuit when said beacon device is arranged to operate as a squegging oscillator for providing a characteristic audible monitoring tone indicative of such operation.

9. A beacon device according to claim 8, wherein further switch means are provided and coupled to said electro-mechanical transducer for coupling its input to the plate circuit of the one tube of the oscillator circuit when said beacon device is arranged to operate as a super-regenerative receiver, whereby a single transducer functions as a speaker for the receiver or as a monitoring means for the oscillator when said beacon device is arranged to operate as a super-regenerative receiver or as a squegging oscillator, respectively.

10. A beacon device according to claim 6, wherein said timing circuit comprises modulating means including an electro-mechanical transducer responsive to voice signals for controlling the timing circuit to cause said beacon device when operating as a squegging oscillator to generate spaced bursts of radio frequency energy with the frequency of said bursts being variable about a mean high audio frequency in response to said voice signals.

11. A beacon device according to claim 10, wherein further switch means are provided and coupled between said electro-mechanical transducer and the one tube of said oscillator circuit for coupling the input of said transducer to the plate circuit of said tube when said oscillator circuit is arranged to operate as a super-regenerative detector, whereby received intelligence bearing signals are converted into sound.

12. A beacon device for use in a radio locating system of the homing type comprising a one tube squegging oscillator, an amplifier having an input and an output, an electro-mechanical transducer, means for altering the mode of operation of said oscillator whereby it functions as a super-regenerative receiver, and switch means interconnecting said last mentioned means, said oscillator, said amplifier and said transducer, and arranged in a first position to connect the input and output of said amplifier to said transducer and to said oscillator, respectively, while maintaining said mode altering means inoperative, said switch means being arranged in a second position to render operative said mode altering means and to connect the input and output of said amplifier to said oscillator and to said transducer, respectively, whereby with said switch means in said first position said beacon device operates as a pulse frequency modulated transmitter of radio frequency energy, and with said switch means in said second position said beacon device functions as a super-regenerative receiver to receive intelligence bearing radio frequency signals.

13. A radio transmitting device according to claim 2, wherein said parallel resonant ringing circuit includes a damping resistance and keying means for manually altering the value of said damping resistance, whereby the number of pulses generated in a group is manually variable for communicating in code.

14. A radio transmitting device for use in a radio locating system of the homing type, said transmitting device including a squegging oscillator comprising a vacuum tube having at least a control grid and a cathode, circuit means coupled with said tube for causing oscillation thereof at a given radio frequency, a timing resistor connected in series with a timing capacitor, means for maintaining the free end of said timing resistor at a positive potential with respect to the free end of said timing capacitor, said timing capacitor being connected between said control grid and said cathode, an amplifier having an input and an output, the output of said amplifier being connected across said timing capacitor, and an electromechanical transducer responsive to voice signals connected to the input of said amplifier, said oscillator generating spaced bursts of radio frequency energy, the frequency of said bursts being variable about a mean high audio frequency in response to said voice signals.

References Cited in the file of this patent

UNITED STATES PATENTS

| | | |
|---|---|---|
| 1,898,181 | Hansell | Feb. 21, 1933 |
| 1,993,436 | Eberhard | Mar. 5, 1935 |
| 2,133,646 | Pierce | Oct. 18, 1938 |
| 2,482,974 | Gordon | Sept. 27, 1949 |
| 2,491,244 | Becker | Dec. 13, 1949 |
| 2,497,411 | Krumhansl | Feb. 14, 1950 |
| 2,541,986 | Cleeton | Feb. 20, 1951 |
| 2,561,421 | Seale et al. | July 24, 1951 |
| 2,565,523 | Russell et al. | Aug. 28, 1951 |
| 2,632,812 | Cooney | Mar. 14, 1953 |
| 2,671,166 | O'Brien | Mar. 2, 1954 |
| 2,697,166 | MacNichol et al. | Dec. 14, 1954 |
| 2,698,380 | Gross | Dec. 28, 1954 |

OTHER REFERENCES

"Radio Engineers Handbook," by Terman, page 514.